(12) United States Patent
Beise et al.

(10) Patent No.: US 10,908,253 B2
(45) Date of Patent: Feb. 2, 2021

(54) INTERFERENCE MITIGATION IN AUTOMOTIVE RADAR SYSTEMS BY ARTIFICIAL DOPPLER MODULATION

(71) Applicant: IEE INTERNATIONAL ELECTRONICS & ENGINEERING S.A., Echternach (LU)

(72) Inventors: Hans-Peter Beise, Perl (DE); Udo Schroder, Fohren (DE); Thomas Stifter, Trier (DE)

(73) Assignee: IEE INTERNATIONAL ELECTRONICS & ENGINEERING S.A., Echternach (LU)

(*) Notice: Subject to any disclaimer, the term of this patent is extended or adjusted under 35 U.S.C. 154(b) by 0 days.

(21) Appl. No.: 16/604,093

(22) PCT Filed: Mar. 29, 2018

(86) PCT No.: PCT/EP2018/058191
§ 371 (c)(1),
(2) Date: Oct. 9, 2019

(87) PCT Pub. No.: WO2018/188972
PCT Pub. Date: Oct. 18, 2018

(65) Prior Publication Data
US 2020/0386853 A1    Dec. 10, 2020

(30) Foreign Application Priority Data

Apr. 12, 2017  (LU) .......................... 100172

(51) Int. Cl.
*G01S 7/02* (2006.01)
*G01S 7/35* (2006.01)
*G01S 13/931* (2020.01)

(52) U.S. Cl.
CPC .............. *G01S 7/023* (2013.01); *G01S 7/354* (2013.01); *G01S 13/931* (2013.01); *G01S 2007/356* (2013.01)

(58) Field of Classification Search
CPC ........ G01S 7/023; G01S 7/354; G01S 13/931; G01S 13/18; G01S 13/53; G01S 13/64; G01S 2007/356
(Continued)

(56) References Cited

U.S. PATENT DOCUMENTS

2007/0188373 A1   8/2007   Shirakawa et al.
2015/0198700 A1*  7/2015   Morita .................. G01S 13/284
                                                   342/59

(Continued)

FOREIGN PATENT DOCUMENTS

DE    19546653 A1    6/1997
EP     1821118 A1    8/2007
WO  WO2016030656 A1  3/2016

OTHER PUBLICATIONS

International Search Report corresponding to International application No. PCT/EP20181058191, dated Jun. 20, 2018, 4 pages.

(Continued)

*Primary Examiner* — Erin F Heard
*Assistant Examiner* — Michael W Justice
(74) *Attorney, Agent, or Firm* — Reising Ethington P.C.

(57) ABSTRACT

A method of operating an automotive radar system that includes a radar transmitter unit for transmitting radar waveforms towards a scene, a radar receiving unit for receiving radar waveforms that have been reflected by a target in the scene, and an evaluation and control unit for decoding range-Doppler information from the received waveforms. The method includes: transmitting a first sequence of radar waveforms ($x_{Tx}$) and a second sequence of radar waveforms (Continued)

($\tilde{x}_{Tx,k}$) towards the scene that differs from the first transmitted sequence of radar waveforms ($x_{Tx}$) by predetermined phase shifts ($\varphi_k$) such that each radar waveform ($\tilde{x}_{Tx,k}$) of the second sequence has a different predetermined phase shift ($\varphi_k$). First range-Doppler information and second range-Doppler information are decoded. Deviations of the second range-Doppler information from the first range-Doppler information are compared to at least one predetermined deviation value. Based on the results of the comparing, a potential interference condition is identified.

12 Claims, 2 Drawing Sheets

(58) Field of Classification Search
USPC .................................................. 342/109, 110
See application file for complete search history.

(56) References Cited

U.S. PATENT DOCUMENTS

| 2016/0041256 A1 | 2/2016 | Schofield, III et al. |
| 2016/0238694 A1* | 8/2016 | Kishigami ............ G01S 13/931 |
| 2017/0031013 A1* | 2/2017 | Halbert .................. G01S 7/415 |

OTHER PUBLICATIONS

Written Opinion corresponding to International application No. PCT/EP2018/058191, dated Jun. 20, 2018, 6 pages.
G. Brooker, "Mutual Interference of Millimeter-Wave Radar Systems", IEEE Trans. Electromagn. Compat., vol. 49, No. 1, dated Feb. 2007, pp. 170-181.
M. Goppelt et al., "Automotive Radar—Investigation of Mutual Interference Mechanisms", Adv. Radio Sci., 2010, pp. 55-60.
N. Levanon et al., "Comparison Between Linear FM and Phase-Coded CW Radars", IEE Proc.-Radar, Sonar Navig., vol. 141, No. 4, dated Aug. 1994, pp. 230-240.

* cited by examiner

INTERFERENCE MITIGATION IN AUTOMOTIVE RADAR SYSTEMS BY ARTIFICIAL DOPPLER MODULATION

TECHNICAL FIELD

The present invention generally relates to a method of operating an automotive radar system for avoiding interference by other radar systems, and to an automotive radar system operable pursuant to such method.

BACKGROUND OF THE INVENTION

It is known in the art to employ radar technology in exterior automotive applications, such as driver assistance systems, for providing improved safety by facilitating an optimized reaction of a driver of a vehicle with appropriate warnings such as vulnerable road user detection systems, lane change assist systems or blind spot monitoring systems, or even by automatically taking over control of the vehicle, for instance in collision mitigation systems. The most common exterior automotive rated devices operate at radar carrier frequencies in a regime about 24 GHz or about 77 GHz.

With the rapid spread of exterior automotive radar devices, mutual interference of different road users has been recognized as a potential problem, which has been studied in detail in European Union program MOSARIM (MOre Safety for All by Radar Interference Mitigation) between 2010 and 2012. Possible effects of mutual interference besides a general increase of noise level are a masking of targets and an appearance of ghost targets. The MOSARIM program identified and evaluated interference mitigation techniques in the polarization domain, the time domain, the frequency domain, the coding domain and the space domain.

An analysis of mutual interference mechanisms of automotive radar systems is provided, for instance, in the article by G. Brooker, "*Mutual Interference of Millimeter-Wave Radar Systems*," IEEE Trans. Electromagn. Compat., vol. 49, no. 1, pp. 170-181, February 2007. Generic interference scenarios and a current status at that time is provided in the article by M. Goppelt et al., "*Automotive radar—investigation of mutual interference mechanisms*", Adv. Radio Sci., vol. 8, pp. 55-60, 2010. Both these documents shall hereby be incorporated by reference in their entirety with effect for those jurisdictions permitting incorporation by reference.

Further, interference mitigation techniques have also been proposed in patent literature. For example, patent application publication DE 195 46 653 A1 describes a method for reducing mutual interference of pulse Doppler radar devices. Individual transmitted bursts are composed of transmission pulses which have different phase shifts according to a predetermined code from transmission pulse to transmission pulse. In a receive path, the phase shifts of the received echoes are decoded according to the predetermined code, i.e. are compensated or are taken into account or evaluated during an evaluation according to the predetermined code.

European patent application EP 1 821 118 A1 proposes a search/detection apparatus comprising a generation device for modulating a carrier signal by a modulation signal and generating a probe signal for detecting location of a target; a transmitting sensor for radiating the probe signal; a receiving sensor for receiving the probe signal reflected by the target as an echo signal; an extraction device for extracting distance information about the target from the echo signal; an interference detection device for detecting existence of an interference signal other than the echo signal from a signal received by the receiving sensor and outputting a detection signal; and a control device for modifying a parameter of the modulation signal when receiving the detection signal from the interference detection device. The control device can modify at least one of an initial time, a phase, and a cycle of the modulation signal as the parameter of the modulation signal.

SUMMARY

It is therefore an object of the invention to provide an automotive radar system with an improved mitigation of potential interference, for example by other automotive radar systems.

In one aspect of the present invention, the object may be achieved by a method of operating an automotive radar system for avoiding interference by other radar systems. The automotive radar system includes a radar transmitter unit, a radar receiving unit and an evaluation and control unit. The radar transmitter unit is configured to transmit radar waveforms having a radar carrier frequency towards a scene. The radar receiving unit is configured for receiving radar waveforms that have been transmitted by the radar transmitter unit and have been reflected by a target in the scene. The evaluation and control unit is configured for decoding range-Doppler information from the radar waveforms received by the radar receiving unit.

The term "automotive radar system", as used in this application, shall particularly be understood to encompass radar systems for vehicles such as but not limited to passenger cars, trucks and buses. The phrases "configured for" and "configured to", as used in this application, shall in particular be understood as being specifically programmed, laid out, furnished or arranged.

As is well known in the art, automotive radar systems can be configured for transmitting radar waves in a modulated continuous mode, for instance in frequency-modulated continuous wave (FMCW) radar systems, in which a time delay between a transmitted radar wave and a received radar wave, which is a transmitted radar wave reflected by a target, is determined by both a range between target and radar system and a velocity of the target with respect to the radar system (Doppler effect). A separation between the effects of range and velocity can be carried out by applying well-known techniques, for instance triangular radar wave modulation or alternate transmission of modulated and unmodulated radar waves. The phrase "range-Doppler information", as used in this application, shall particularly be understood as the information included in the received radar waves before a separation of the effects of range and velocity is performed.

According to this first aspect of the invention, the method comprises steps of:

transmitting a first sequence of radar waveforms towards a scene, receiving first radar waveforms that have been reflected by a target hit by the transmitted first sequence of radar waveforms, decoding first range-Doppler information from the received first radar waveforms, transmitting at least a second sequence of radar waveforms towards the scene that differs from the first transmitted sequence of radar waveforms by predetermined phase shifts such that each radar waveform of the second sequence has a different predetermined phase shift, receiving second radar waveforms that have been reflected by the target hit by the transmitted second sequence of radar waveforms, decoding second range-Doppler information from the received second radar waveforms, comparing deviations of the first range-Doppler information from the second range-Doppler information to at least one predetermined deviation value, and based on the results of the comparing, identifying a potential interference condition.

Advantageously, by applying decoding techniques known per se to the received second radar waveforms, there results a predefined signal shift with respect to the received first radar waveforms. The predefined signal shift can be used to 'mark' signals obtained from a sequence of radar waveforms transmitted by the automotive radar system itself, as it does not occur in radar waves transmitted by and unintentionally received from other automotive radar systems. By marking the signals obtained from the radar waveforms transmitted by the automotive radar system itself, potential interference from other automotive radar systems can be identified. The chances of a potentially interfering automotive radar system performing an identical predefined signal shift can virtually be excluded.

The potential interference condition can, for instance, be accounted for by simply detecting that a function of the automotive radar system is affected by interference, by identifying ghost targets and/or by finding targets that are hidden in interference patterns. For example, any portion of a decoded signal that does not show the predefined signal shift and that exceeds a predetermined threshold value for a signal amplitude may trigger a detection of the automotive radar system being affected by interference. As another example, a portion of the decoded signal that does not show the predefined signal shift and that indicates a target in a specific range can be identified as a ghost target.

Those skilled in the art will readily acknowledge that the method in accordance with the invention can also beneficially be applied to automotive radar systems in which the range-Doppler information is combined with additional spatial decoding, for example an angular decoding.

It is further noted herewith that the terms "first", "second", etc. are used in this application for distinction purposes only, and are not meant to indicate or anticipate a sequence or a priority in any way.

The radar transmitter unit can have one transmit antenna or more than one transmit antennas for transmitting radar waveforms. The radar receiving unit can have one receiving antenna or more than one receiving antennas for receiving radar waveforms that have been transmitted by the transmit antenna(s) and have been reflected by a target in the scene.

Preferably, the transmit antennas of the radar transmitter unit and the receiving antennas of the radar receiving unit are arrangeable in a front region of a vehicle.

In preferred embodiments of the method, the predetermined phase shifts are based on a Doppler frequency derived from a predetermined velocity relative to a target, and the radar carrier frequency. In this way, a substantial and sufficiently large predefined signal shift can be accomplished after decoding the received radar waveforms.

The chances of a potentially interfering automotive radar system performing an identical predefined signal shift can even be lowered if the predetermined velocity is randomly selected from a predetermined range of velocities.

In preferred embodiments of the method, the steps of transmitting a sequence of radar waveforms include transmitting a plurality of consecutive radar waveforms of identical duration. In this way, the steps of decoding can be carried out with a reduced effort.

Preferably, the step of decoding the first range-Doppler information and the second range-Doppler information comprises sorting the respective range-Doppler information into a plurality of range gates and a plurality of Doppler bins, and the step of comparing deviations comprises comparing a mutual shift between the range-Doppler information along the respective plurality of Doppler bins.

The decoding of the range-Doppler information can be carried out by the techniques known in the art, for instance the twofold FFT in fast time and slow time, respectively, that is commonly used in FMCW processing. By applying the proposed phase shift, the second range-Doppler information will show a predetermined shift along the Doppler bins. In this way, the step of comparing deviations can readily be executed.

In preferred embodiments of the method, the step of decoding includes dechirping the received radar waveforms and carrying out either a fast Fourier transform (FFT) or a correlation analysis at the dechirped radar waveforms. This step of decoding can be beneficially applied in particular for automotive radar systems designed as an FMCW radar system (FFT) or for automotive radar systems designed as an PMCW radar system (correlation analysis). Dechirping techniques are well-known in the art and therefore need not be discussed in more detail herein.

Preferably, the step of transmitting sequences of radar waveforms towards the scene comprises transmitting frequency-modulated or phase-modulated continuous radar waves towards the scene. In this way, the well-known advantages of frequency-modulated continuous wave (FMCW) radar systems or phase-modulated continuous wave (PMCW) radar systems can readily be utilized. The assets and drawbacks of FMCW and PMCW radar systems are, for instance, discussed in Levanon, N., and B. Getz: "*Comparison between linear FM and phase-coded CW radars*", IEE Proceedings-Radar, Sonar and Navigation 141.4 (1994), 230-240.

In another aspect of the invention, an automotive radar system is provided that comprises a radar transmitter unit, a radar receiving unit and an evaluation and control unit. The radar transmitter unit is configured to transmit at least a sequence of radar waveforms towards a scene according to a first predetermined pattern. The radar waveforms have a radar carrier frequency. The radar receiving unit is configured for receiving radar waveforms that have been transmitted by the radar transmitter unit and have been reflected by a target in the scene. The evaluation and control unit is configured for decoding range-Doppler information from the radar waveforms received by the radar receiving unit.

The radar transmitter unit is further configured to transmit, at predetermined points in time and/or in predetermined time intervals, a sequence of radar waveforms according to a second predetermined pattern that differs from the first predetermined pattern by predetermined phase shifts such that each radar waveform of the second sequence has a different predetermined phase shift.

The evaluation and control unit is configured to:
decode first range-Doppler information from radar waveforms received after reflection of the sequence of radar waveforms according to the first predetermined pattern at the target,
decode second range-Doppler information from radar waveforms received after reflection of the sequence of radar waveforms according to the second predetermined pattern at the target, compare deviations of the first range-Doppler information from the second range-Doppler information to at least one predetermined deviation value, and to identify, based on the result of the comparison, a potential interference condition.

The benefits described in context with the method proposed herein apply to the automotive radar system to the full extent. The potential interference condition can be accounted for, for instance by simply detecting that a function of the automotive radar system is affected by interference, by identifying ghost targets and/or by finding targets that are hidden in interference patterns.

In preferred embodiments, the automotive radar system further comprises pluralities of range gates and pluralities of Doppler bins for sorting the decoded first range-Doppler information and the decoded second range-Doppler information. Deviations of the first range-Doppler information from the second range-Doppler information are indicated by mutual shifting of activated positions along the pluralities of Doppler bins. In this way, the deviations can be identified in a particularly easy manner.

Preferably, the radar transmitter unit and the radar receiving unit form an integral part of a transceiver unit, wherein the radar transmitter unit and the radar receiving unit share a common circuitry and/or share a common housing. Such an embodiment can provide a compact design and is especially beneficial for building a monostatic automotive radar system.

Preferably, the evaluation and control unit comprises a processor unit and a digital data memory unit to which the processor unit has data access. In this way, the steps of decoding and the steps of comparing deviations and identifying a potential interference condition can be performed within the automotive radar system in proximity to the radar receiving unit to ensure a fast and undisturbed signal processing and evaluation.

In yet another aspect of the invention, a software module for controlling an automatic execution of steps of an embodiment of the method disclosed herein is provided.

The method steps to be conducted are converted into a program code of the software module, wherein the program code is implementable in a non-transitory computer-readable medium such as a digital memory unit of the automotive radar system, and is executable by a processor unit of the automotive radar system. Preferably, the digital memory unit and/or processor unit may be a digital memory unit and/or a processing unit of the evaluation and control unit of the automotive radar system. The processor unit may, alternatively or supplementary, be another processor unit that is especially assigned to execute at least some of the method steps.

The software module can enable a robust and reliable execution of the method and can allow for a fast modification of method steps.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DESCRIPTION OF PREFERRED EMBODIMENTS

Figure 1:
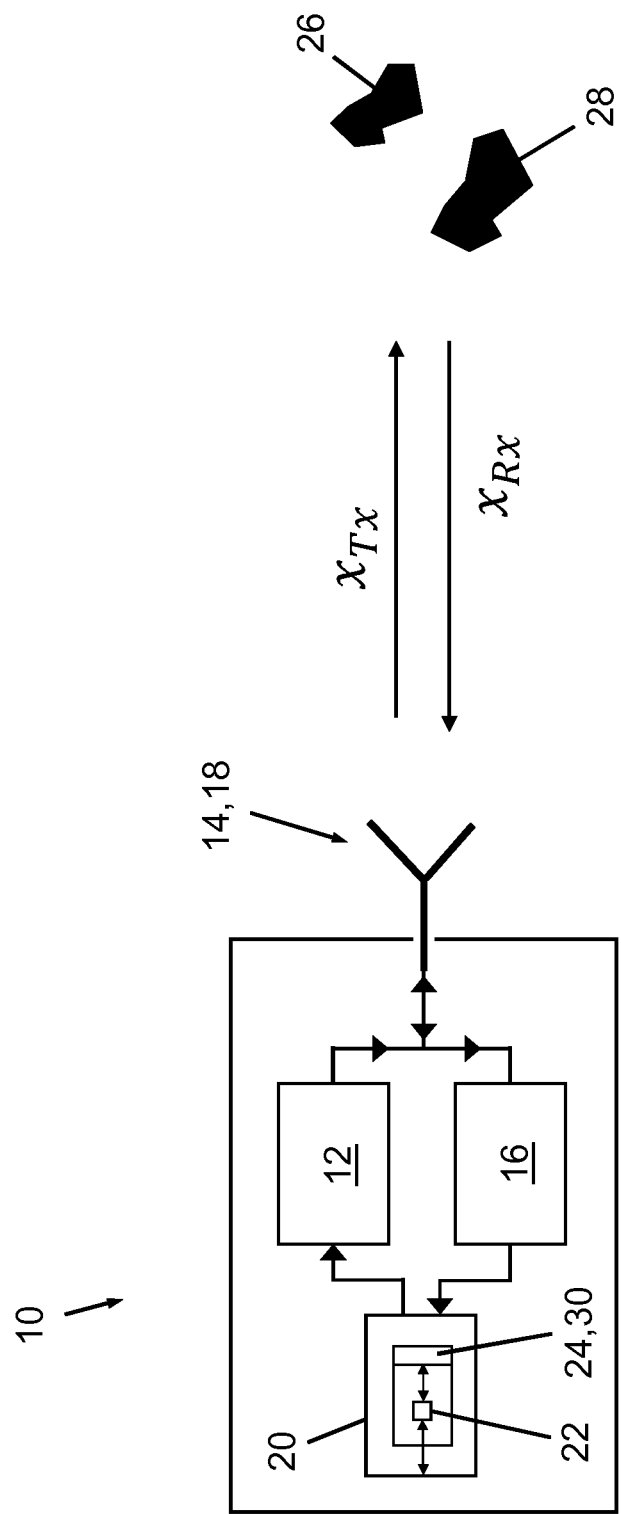
FIG. 1 schematically illustrates a configuration of an automotive radar system in accordance with the invention and targets in a scene.

FIG. 1 schematically illustrates a configuration of an automotive radar system 10 in accordance with an embodiment of the invention and targets 26, 28 of a scene. The automotive radar system 10 is designed as a frequency-modulated continuous wave (FMCW) radar system and is installable in a vehicle such as a passenger car (not shown).

The automotive radar system 10 comprises a radar transmitter unit 12, a radar receiving unit 16 and an evaluation and control unit 20 that is connected by data links to both the radar transmitter unit 12 and the radar receiving unit 16.

The radar transmitter unit 12 includes a radar transmit antenna 14 that is directed towards the scene. The radar receiving unit 16 includes a radar receiving antenna 18 that is also directed towards the scene. The radar transmit antenna 14 and the radar receiving antenna 18 are co-located in a monostatic arrangement, which is indicated in FIG. 1 by use of a combined symbol. In this specific embodiment, the radar transmitter unit 12 and the radar receiving unit 16 form an integral part of a transceiver unit. In other embodiments, the radar transmitter unit 12 and the radar receiving unit 16 may be designed as separate units. The evaluation and control unit 20 comprises a processor unit 22 and a digital data memory unit 24 to which the processor unit 22 has data access.

Controlled by the evaluation and control unit 20, the radar transmitter unit 12 is configured to transmit a sequence of radar waveforms $x_{Tx}$ to the scene. The sequence of radar waveforms $x_{Tx}$ is formed according to a first predetermined pattern, which is given by consecutively transmitted radar waveforms $x_{Tx}$ of a predefined duration $\tau$. The individual transmitted radar waveforms $x_{Tx}$ have a radar carrier frequency of about 77.0 GHz that is triangle wave frequency-modulated.

The radar receiving unit 16 is configured for receiving radar waveforms that have been transmitted by the radar transmitter unit 12 and have been reflected by at least one of the targets 26, 28 in the scene. Signals generated by the radar receiving unit 16 are transferred to the evaluation and control unit 20 via the data link. The evaluation and control unit 20 is configured for decoding range-Doppler information from radar waveforms $x_{Rx}$ received by the radar receiving unit 16 and continually processes received radar waveform excerpts $x_{Rx}$ of duration $\tau$. The radar receiving unit 16 comprises pluralities of range gates and pluralities of Doppler bins (not shown) for sorting the decoded range-Doppler information.

The received radar waveform excerpts $x_{Rx}$ are transformed in order to decode spatial information of the reflecting target 26, 28. This can formally be expressed by a mapping $T(x_{Rx}) = x_\alpha$. In this specific embodiment, the transform T is given by a subsequent application of a dechirp algorithm and a fast Fourier transform (FFT). In an alternative embodiment, in which the automotive radar system may be designed as a phase-modulated continuous wave (PMCW) radar system, the transform may be given by a subsequent application of a dechirp algorithm and a correlation analysis.

In order to decode the Doppler frequency, the spatial decoding is repeated for a plurality of N times, wherein N is a power of 2 selected between 128 and 1024. That is, a sequence of transformed signals $$T(x_{Rx,1})=x_{a,1}; T(x_{Rx,2})=x_{a,2}; \ldots ; T(x_{Rx,N})=x_{a,N}$$

is recorded for Doppler decoding.

Controlled by the evaluation and control unit 20, the radar transmitter unit 12 is configured to transmit, at predetermined points in time that are timely spaced by a multiple of N·τ, a sequence of radar waveforms $\tilde{x}_{Tx,k}$ according to a second predetermined pattern that differs from the first predetermined pattern by predetermined phase shifts $\varphi_k$ such that each radar waveform $\tilde{x}_{Tx,k}$ of the second sequence has a different predetermined phase shift $\varphi_k$. The sequence of radar waveforms $\tilde{x}_{Tx,k}$ according to the second predetermined pattern is transmitted in lieu of the sequence of radar waveforms $x_{Tx}$ according to the first predetermined pattern.

The sequence of radar waveforms $\tilde{x}_{Tx,k}$ according to the second predetermined pattern can be expressed as $$e^{2\pi i \cdot k} \cdot x_{Tx} \text{ for } k=1,2,\ldots,N$$

In one approach, the predetermined phase shifts $\varphi_k$ are based on a Doppler frequency $f_v$ derived from a predetermined relative velocity v that is randomly selected from a predetermined range of velocities, which in this specific embodiment is a range between 0.5 m/s and 10.0 m/s for parking purposes, and is randomly selected as a velocity v of 1.0 m/s, between the automotive radar system 10 and the target 26, 28, and the radar carrier frequency.

For a fixed relative velocity v between the automotive radar system 10 and the target 26, 28, hence a fixed Doppler shift, the above transform undergoes a phase shift corresponding to the Doppler frequency $f_v$ $$x_{a,k} \approx e^{2\pi i \cdot f_v \cdot k \cdot \tau} \cdot x_{a,1} \text{ for } k=1,2,\ldots,N$$

The various Doppler shifts present in the radar-illuminated scene superimpose in the range gates and Doppler bins. Hence, the spatial information can be divided in separated Doppler bins by means of the FFT of length N in the single range gates.

In other words, transmission of the sequence of radar waveforms $\tilde{x}_{Tx,k}$ according to the second predetermined pattern results in a predefined shift of the spatial information in the Doppler bins with respect to the transmission of the sequence of radar waveforms $x_{Tx}$ according to the first predetermined pattern.

In the following, an embodiment of a method of operating the automotive radar system 10 pursuant to FIG. 1 for avoiding interference by other radar systems will be described. A flowchart of the method is provided in FIG. 2. In preparation of operating the automotive radar system 10, it shall be understood that all involved units and devices are in an operational state and configured as illustrated in FIG. 1.

In order to be able to carry out the method automatically and in a controlled way, the evaluation and control unit 10 comprises a software module 30 (FIG. 1). The method steps to be conducted are converted into a program code of the software module 30. The program code is implemented in the digital data memory unit 24 of the evaluation and control unit 20 and is executable by the processor unit 22 of the evaluation and control unit 20.

All predetermined/predefined values, thresholds and tolerance margins mentioned herein such as phase shifts, range of relative velocity, deviation value, radar waveform duration etc. reside in the digital data memory unit 24 of the evaluation and control unit 20 and can readily be retrieved by the processor unit 22 of the evaluation and control unit 20.

Figure 2:
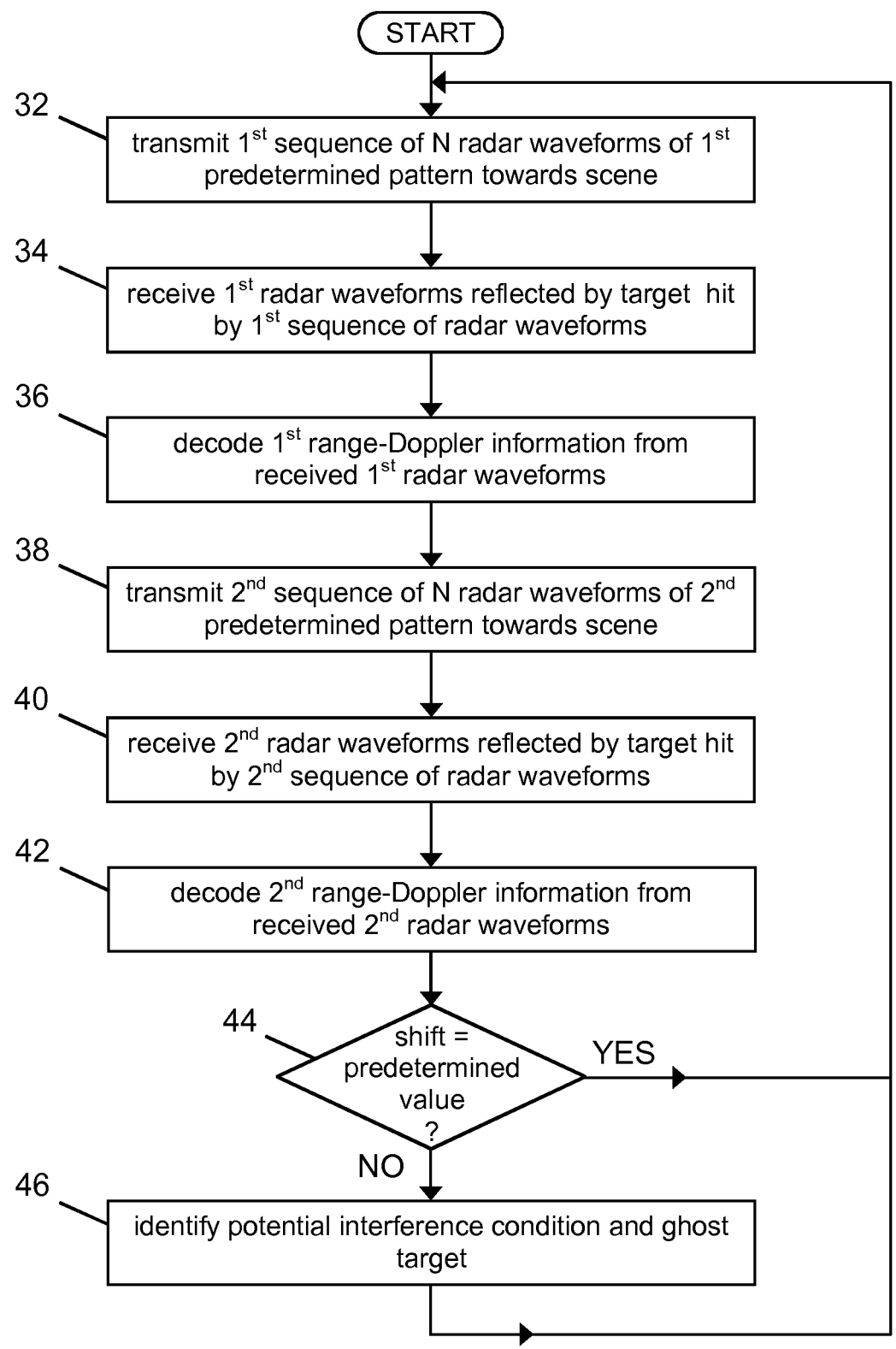
FIG. 2 is a flowchart of an embodiment of a method in accordance with the invention.

Referring now to FIG. 2, in a first step 32 of the method a first sequence of N radar waveforms $x_{Tx,1}, x_{Tx,2}, \ldots, x_{Tx,N}$ according to the first predetermined pattern is transmitted over time N·τ towards the scene.

In a next step 34 of the method, first radar waveform excerpts $x_{Rx,1}, x_{Rx,2}, \ldots, x_{Rx,N}$, each one of duration τ, are received that have been reflected by the target 26, 28 hit by the transmitted first sequence of radar waveforms $x_{Tx}$. In another step 36, a first range-Doppler information is decoded as described before from the received first radar waveform excerpts $x_{Rx,1}, x_{Rx,2}, \ldots, x_{Rx,N}$. As an interim result of the step 36 of decoding, transformed signals $T(x_{Rx,1})=x_{a,1}; T(x_{Rx,2})=x_{a,2}; \ldots ; T(x_{Rx,N})=x_{a,N}$ are generated, which represent N times the range information of the reflecting target 26, 28. The first range-Doppler information is derived by applying the FFT of length N over the single range gates. Then, in another step 38 of the method, a second sequence of radar waveforms $\tilde{x}_{Tx,k} := e^{2\pi i \cdot f_v \cdot \tau} \cdot x_{Tx,1}; e^{2\pi i \cdot f_v \cdot 2\tau} \cdot x_{Tx,2}; \ldots ; e^{2\pi i \cdot f_v \cdot N\tau} \cdot x_{Tx,1}$ is transmitted to the scene according to the second predetermined pattern, differing from the first predetermined pattern by the predetermined phase shifts $2\pi i \cdot f_v \cdot k\tau$, which are based on the Doppler frequency $f_v$ derived from the randomly selected predetermined relative velocity v of 1.0 m/s.

In a next step 40, second radar waveform excerpts $\tilde{x}_{Rx,1}, \tilde{x}_{Rx,2}, \ldots, \tilde{x}_{Rx,N}$ of duration τ are received that have been reflected by the target 26, 28 hit by the transmitted second sequence of radar waveforms $\tilde{x}_{Tx,k}$. In another step 42, a second range-Doppler information is decoded as described before from the received second radar waveform excerpts $\tilde{x}_{Rx,1}, \tilde{x}_{Rx,2}, \ldots, \tilde{x}_{Rx,N}$. As an interim result of the step 42 of decoding, transformed signals $T(\tilde{x}_{Rx,1})=\tilde{x}_{a,1}; T(\tilde{x}_{Rx,2})=\tilde{x}_{a,2}; \ldots ; T(\tilde{x}_{Rx,N})=\tilde{x}_{a,N}$ are generated, which represent N times the range information of the hit target 26, 28. The second range-Doppler information is derived by applying the FFT of length N over the single range gates.

With respect to the first range-Doppler information, the second range-Doppler information is shifted along the Doppler bins in Doppler dimension by the velocity v, which is a predetermined value.

A deviation of the second range-Doppler information from the first range-Doppler information is given by the shift along the Doppler bins by the predetermined velocity v. This deviation is compared to a predetermined deviation value for a shift along the Doppler bins in a next step 44 of the method.

In another step 46 of the method, based on the results of the step of comparing 44, a potential interference condition is identified in case that the result of the comparison is negative, and ghost targets are identified. In case that the deviation is equal to the predetermined deviation value within predefined margins of tolerance, targets are identified as being properly detected and regular operation of the automotive radar system 10 can be confirmed, for instance by sending an appropriate information to an electronic control unit of the vehicle.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the draw-

The invention claimed is:

1. A method of operating an automotive radar system for avoiding interference by other radar systems, the automotive radar system including:
   a radar transmitter that is configured to transmit radar waveforms ($x_{Tx}$, $\tilde{x}_{Tx}$) having a radar carrier frequency towards a scene,
   a radar receiver that is configured for receiving radar waveforms ($x_{Rx}$, $\tilde{x}_{Rx}$) that have been transmitted by the radar transmitter and have been reflected by a target in the scene, and
   an evaluation and control unit that is configured for decoding range-Doppler information from the radar waveforms ($x_{Rx}$, $\tilde{x}_{Rx}$) received by the radar receiver,
the method comprising steps of:
   transmitting a first sequence of radar waveforms ($x_{Tx}$) towards a scene,
   receiving first radar waveforms ($x_{Rx}$) that have been reflected by a target hit by the transmitted first sequence of radar waveforms ($x_{Tx}$),
   decoding first range-Doppler information from the received first radar waveforms ($x_{Rx}$),
   transmitting at least a second sequence of radar waveforms ($\tilde{x}_{Tx,k}$) towards the scene that differs from the first transmitted sequence of radar waveforms ($x_{Tx}$) by predetermined phase shifts ($\varphi_k$) such that each radar waveform ($\tilde{x}_{Tx,k}$) of the second sequence has a different predetermined phase shift ($\varphi_k$),
   receiving second radar waveforms ($\tilde{x}_{Rx,k}$) that have been reflected by the target hit by the transmitted second sequence of radar waveforms ($\tilde{x}_{Tx,k}$),
   decoding second range-Doppler information from the received second radar waveforms ($\tilde{x}_{Rx,k}$),
   comparing deviations of the second range-Doppler information from the first range-Doppler information to at least one predetermined deviation value, and
   based on the results of the comparing, identifying a potential interference condition.

2. The method as claimed in claim 1, wherein the predetermined phase shifts ($\varphi_k$) are based on a Doppler frequency ($f_v$) derived from a predetermined velocity (v) relative to a target and the radar carrier frequency.

3. The method as claimed in claim 2, wherein the predetermined velocity (v) is randomly selected from a predetermined range of velocities.

4. The method as claimed in claim 1, wherein the steps of transmitting a sequence of radar waveforms include transmitting a plurality of consecutive radar waveforms ($x_{Tx}$, $\tilde{x}_{Tx,k}$) of identical duration ($\tau$).

5. The method as claimed in claim 1, wherein the steps of decoding the first range-Doppler information and the second range-Doppler information comprises sorting the respective range-Doppler information into a plurality of range gates and a plurality of Doppler bins, and the step of comparing deviations comprises comparing a mutual shift between the range-Doppler information along the respective plurality of Doppler bins.

6. The method as claimed in claim 1, wherein the steps of decoding include dechirping the received radar waveforms ($x_{Rx}$, $\tilde{x}_{Rx,k}$) and carrying out either a fast Fourier transform or a correlation analysis at the dechirped radar waveforms.

7. The method as claimed in claim 1, wherein the steps of transmitting sequences of radar waveforms ($x_{Tx}$, $\tilde{x}_{Tx,k}$) towards the scene comprises transmitting frequency-modulated or phase-modulated continuous radar waves towards the scene.

8. An automotive radar system, comprising:
   a radar transmitter that is configured to transmit at least a sequence of radar waveforms ($x_{Tx}$) towards a scene according to a first predetermined pattern, the radar waveforms having a radar carrier frequency,
   a radar receiver that is configured for receiving radar waveforms ($x_{Rx}$) that have been transmitted by the radar transmitter and have been reflected by a target in the scene,
   an evaluation and control unit that is configured for decoding range-Doppler information from the radar waveforms ($x_{Rx}$) received by the radar receiver,
wherein:
   the radar transmitter is further configured to transmit, at predetermined points in time and/or in predetermined time intervals, a sequence of radar waveforms ($\tilde{x}_{Tx}$) according to a second predetermined pattern that differs from the first predetermined pattern by predetermined phase shifts ($\varphi_k$) such that each radar waveform ($\tilde{x}_{Tx,k}$) of the second sequence has a different predetermined phase shift ($\varphi_k$),
and wherein:
   the evaluation and control unit is configured to:
      decode first range-Doppler information from radar waveforms ($x_{Rx}$) received after reflection of the sequence of radar waveforms ($x_{Tx}$) according to the first predetermined pattern at the target,
      decode second range-Doppler information from radar waveforms ($\tilde{x}_{Rx,k}$) received after reflection of the sequence of radar waveforms ($\tilde{x}_{Tx,k}$) according to the second predetermined pattern at the target,
      compare deviations of the first range-Doppler information from the second range-Doppler information to at least one predetermined deviation value, and
      identify, based on the result of the comparison, a potential interference condition.

9. The automotive radar system as claimed in claim 8, further comprising pluralities of range gates and pluralities of Doppler bins for sorting the decoded first range-Doppler information and the decoded second range-Doppler information, wherein deviations of the first range-Doppler information from the second range-Doppler information are indicated by mutual shifting of activated positions along the pluralities of Doppler bins.

10. The automotive radar system as claimed in claim 8, wherein the radar transmitter and the radar receiver form an integral part of a transceiver.

11. The automotive radar system as claimed in claim 8, wherein the evaluation and control unit comprises a processor and a digital data memory to which the processor has data access.

12. A non-transitory computer-readable medium for controlling automatic execution of the method as claimed in claim 1, wherein each of the transmitting, receiving, decoding, and comparing steps to be conducted are stored on the computer-readable medium as a program code, wherein the computer-readable medium comprises a part of the automotive radar system or a separate controller and is executable by a processor of the automotive radar system or the separate controller.

\* \* \* \* \*